April 18, 1961 G. H. J. BROERS 2,980,749

FUEL CELL AND METHOD OF PRODUCING ELECTRODES FOR SUCH A CELL

Filed Sept. 11, 1958 2 Sheets-Sheet 1

INVENTOR.
GERARD H. J. BROERS
BY Hammond and Littell
ATTORNEYS

INVENTOR.
GERARD H. J. BROERS
BY Hammond and Littell
ATTORNEYS

United States Patent Office 2,980,749

Patented Apr. 18, 1961

2,980,749

FUEL CELL AND METHOD OF PRODUCING ELECTRODES FOR SUCH A CELL

Gerard H. J. Broers, 65 Geestersingel, Alkmaar, Netherlands

Filed Sept. 11, 1958, Ser. No. 760,394

Claims priority, application Netherlands Sept. 27, 1957

9 Claims. (Cl. 136—86)

The present invention relates to a fuel cell for the galvanic combustion of gaseous fuels comprising a solid electrolyte or a liquid electrolyte impregnated in a solid inert carrier, which carrier may be sintered, and on both sides of the solid or liquid electrolyte, electrodes in powder form.

The use of powdered material as electrodes in fuel cells is known. In such known fuel cells the solid electrolyte, or the liquid electrolyte in a solid inert carrier which may be sintered—hereinafter to be called semi-solid electrolyte—has generally the shape of a tube closed at the bottom. This tube is filled with a powder, constituting the first electrode and surrounded by a powder constituting the second electrode.

In these cells iron rods, stuck into the powdered electrodes, form the terminals from which current can be drawn.

A drawback of such an arrangement is, that the concentration, polarization and the flow resistance of the gases, as a consequence of the long way these reacting gases have to go through the powdered electrodes, the gases are simply passed through the powdered electrodes, are considerable.

In using solid electrolytes the ohmic resistance of such cells is considerable, unless very high temperatures of about 1000° C. are used.

It is known that at a lower operating temperature, a less high resistance can be obtained by replacing the solid electrolyte by a semi-solid electrolyte. This semi-solid electrolyte can consist of a sintered porous carrier such as magnesium oxide impregnated with a mixture of molten alkali metal carbonates. Such a semi-solid electrolyte has sufficient conductivity at an operating temperature of 450° C.–750° C.

It is an object of the invention to produce fuel cells comprising electrodes which have a low flow resistance to the circulating gases and consequently maintain a low concentration polarization.

It is a further object of the invention to produce fuel cells with a high electrical output per unit of electrode surface.

It is still another object of the invention to produce fuel cells with a long life.

In all fuel cells, the electrode reaction can only take place on the active area where gas, electrode and electrolyte simultaneously contact each other. It is therefore not essential to apply a large volume of electrode material, for only by increasing these active areas of simultaneous contact of gas, electrode and electrolyte can a higher current be obtained.

To draw as much current from the cell as possible, the grains of each electrode of powdered material should have good contact with each other and with the terminals.

I have now found, that a fuel cell, constructed as indicated below, has the advantages which are the objects of this invention and avoids the drawbacks of the known fuel cells.

The fuel cell according to the invention comprises an electrolyte, having both sides of said electrolyte, electrodes in powder form said powder-form, electrodes being attached as adhering layers to both sides of the electrolyte, metal gauzes in contact with each layer of said powder-form electrode and rigid supports with openings for passage of the gases, said rigid supports pressing against said metal gauzes.

As an electrolyte, there can be used a solid electrolyte produced by melting or sintering an alkali metal carbonate or a mixture of alkali metal carbonates.

Mixtures of lithium carbonate, potassium carbonate, sodium carbonate, rubidium carbonate and caesium carbonate are well adapted to this purpose.

It is also possible to use a solid porous carrier impregnated with a mixture of the above-mentioned alkali metal carbonates, which mixture at the working temperature of the cell is in molten condition.

As a solid carrier can be used a solid plate, disk or tube made of porous material which has no ionic conductivity and which is indifferent to the gases and the molten salts coming in contact with it.

The aforesaid porous material can consist of magnesium oxide or any other oxide which does not react with the reactant gases and the fused salt at the operating temperature of the cell. From this material, a plate, disk or tube is pressed into form and subsequently sintered.

The layer of electrolyte or of the carrier, impregnated with the electrolyte, is preferably as thin as possible, to keep the effective internal electrical resistance at its minimum; its final thickness being a function of its required rigidity only.

An electrolyte layer between 1 mm. and 10 mm. thick will generally be sufficient.

It is essential, for the lasting effectiveness of a fuel cell in which the oxidizing as well as the fuel gas are supplied each to only one side of the cell, that the properties of the electrodes do not change by use and that these electrodes have a good electronic conductivity. As anodic electrodes, i.e. as fuel gas electrodes, metals, alloys or mixtures of metals of the iron and palladium-platinum group, such as iron cobalt, nickel, rhodium, palladium, osmium, iridium and platinum, as well as copper, silver, gold, chromium, and manganese, generally meet this requirement. Powdered iron is in fairly common use as an anode. I have found, that in using powder-form electrodes as described hereinbefore some difficulties present themselves. Under continuous use the current which could be drawn from the cells having with this type of electrode decreased after some time. It appeared, that this was caused by the sintering of the powdered electrode grains, by which sintering, the active area of simultaneous contact of gas, electrode and electrolyte, was decreased.

This drawback can be avoided by pretreating the metal powder before it is placed in the cell in such a way that no change in grain size occurs during normal use in this cell.

This can be accomplished by sintering the power before it is placed in the cell at a temperature equal to or a little higher than the operating temperature of the cell. This can be done by reducing an oxide of this powdered metal with a reducing gas such as hydrogen, carbon monoxide or methane.

Other metallic compounds, which by heating either in a reducing gas or in the air, are converted into the metal, can also be used as the starting material from which the powder can be prepared.

When a powder, which has in this way been pretreated, is used, a layer of 1 mm. or less in thickness will suffice; any increase of this thickness brings about an increase of the concentration polarization caused by a decrease of the diffusion of the gas to the active area.

In the sintered, powdered electrodes no mechanical strength is required, the grains are only loosely bound together, and in order to make it possible to draw current from the powdered metal grains these grains are covered by a metal gauze which is resistant to the reacting gases and the electrode powder.

The aforesaid metal gauze preferably is a small-mesh wire-netting consisting, at the anodic side of the electrolyte of metals above mentioned for the anodic electrode, and at the cathodic side of the electrolyte of metals to be indicated later as meeting the requirements for cathodic electrodes.

Nichrome gauzes are advantageous for both sides as they can be used on both sides of the electrolyte and moreover are cheap and easily purchased. Gauzes with openings between 1 mm. and 0.01 mm. are preferable.

When being fitted into the cell the powder grains are preferably fixed on the disk impregnated with electrolyte with an adhesive. As an adhesive, water-glass can be used. When the cell is heated the water evaporates from the water-glass, the small remaining quantity of $Na_2SiO_3$ does not further disturb the operation of the cell, and adhesive forces between the electrolyte and the powder grains take over the function of the water-glass.

Other adhesives may also be used.

The above-mentioned rigid support with openings, to which the current terminal can be attached, if said support is made of metal being in electrical contact with the gauze, has the task to prevent the gauze from warping as such warping would cause the gauze to lessen its contact with the powder grains and consequently lessen its power to draw current from the grains.

In case a non-metal rigid support is used the gauze itself should be provided with a terminal connection.

Said rigid support can be either a perforated metal plate or a metal network, or a ceramic grid as well as a perforated combination of metal and ceramic material.

As cathode material for the cell, silver powder can be used, which at the operating temperature of the cell of 500° C. or higher shows no chemical polarization with regard to oxygen or air up to a current density of at least 15 a./dm.$^2$ and which can be attached to the electrolyte by rubbing it thereon. The silver layer thus obtained has a layer thickness of 0.5 mm. or less. The metals of the platinum-palladium group such as rhodium, palladium, osmium, iridium and platinum and gold and nickel in powder form can also be used as cathode material.

These latter metals can be attached to the electrolyte similarly as the anodic layer and will have the same thickness as mentioned there.

The thin electrode powder layer which has thus been formed with the gauze and/or the rigid support with openings affixed thereto allows good gas circulation to the surface of the electrodes.

The invention is further illustrated with the help of the drawings in which an embodiment of the invention, comprising a disk with electrolyte, is represented, which, however, is not intended to limit the scope of the claims.

Figure 1:
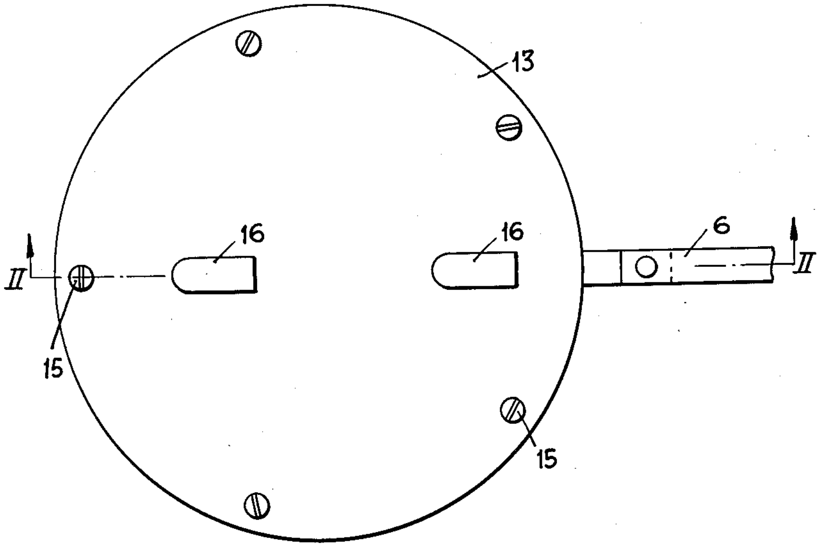
Fig. 1 is a view of a fuel cell from above.
Figure 2:
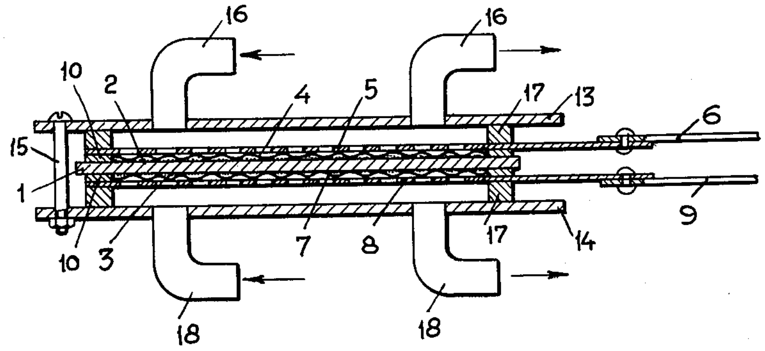
Fig. 2 is a section of the cell of Fig. 1 along II—II in Fig. 1.

The cell of Figs. 1 and 2 consists of an electrolyte, for example a molten mixture of alkali metal carbonates, impregnated in a sintered magnesium oxide disk 1, of a thickness of about 3 mm. On to this disk, are fixed a thin layer of iron powder 2, 0.5 mm. thick, which is obtained by reducing iron oxide with a gaseous reductant, such as hydrogen at about 800° C., as electrode for the fuel gas, and also a thin layer of silver powder 3, 0.1 mm. thick as electrode for the oxidizing gas.

A nichrome gauze 4 makes electrical contact with part of the iron powder grains of the powder layer 2, which gauze in turn makes contact with and is pressed into place by a rigid perforated metal plate 5.

To this rigid metal plate 5, the current terminal 6 is fixed and this forms the negative terminal of the cell.

A nichrome gauze 7 makes electrical contact with the silver powder layer 3, the gauze 7 also makes contact with the perforated metal plate 8, which presses the gauze 7 on to the powder grains 3.

The current terminal 9 is fixed to the metal plate 8 and forms the positive pole of the cell. In the example which is here described, mica rings 10 serve as gaskets between the metal plates 5 and 8 respectively, and the carrier 1 of the electrolyte, and asbestos rings 17 serve as gaskets between the cell covers 13 and 14 and the metal plates 5 and 8. The whole is kept together with a number of set screws 15 in the cell covers 13 and 14.

The cell cover 13 is provided with pipes 16 for supplying and letting out the fuel gas; the cell cover 14 with similar pipes 18 for supplying and letting out the oxygen or the air.

Cells according to this embodiment were dismounted, after having been in continuous use for up to six months. No indications were obtained from which it would be evident that the cells were near the end of their lives after such a period, while all other cells known up till now had a life time of two weeks at most. With carbon monoxide as fuel gas and air as oxidizing agent and at a temperature of 700° C. the following result was obtained after an operating period of a few months.

| Terminal voltage at 700° C. | Current density in a./dm.$^2$ | Power output in w./dm.$^2$ | Yield in reference to the theoretical E.M.F |
| --- | --- | --- | --- |
| 1.08 Volts (theoretical value) | 0 | 0 | 1.0 |
| 1.05 Volts | Open cell | 0 | 0.97 |
| 0.94 Volts | 2 | 1.88 | 0.87 |
| 0.84 Volts | 4 | 3.36 | 0.77 |
| 0.75 Volts | 6 | 4.50 | 0.70 |

In this table it is shown that the terminal voltage is dependent on the current drawn from the cell as a result of its effective internal resistance.

In order to obtain a higher current a plurality of these cells (see Figure 3 of the drawing) were placed in a heat-insulated furnace 21. This furnace 21 was heated up to 700° C. by means of a heating element 19.

Subsequently the fuel gas with the composition of 80 mol percent CO and 20 mol percent $CO_2$ and with a pressure of about 0.5 inch W.G. above atmospheric pressure, was led through the pipe 22 to the anodes of the cells 20, whilst at the same time air of normal composition and with a pressure of 0.75 inch W.G. above atmospheric pressure was led through a pipe 23 to the cathodes of these cells 20 and current was withdrawn from the cells.

In consequence of the internal resistance of the elements heat was developed, which was used to maintain a thermal equilibrium in the inner space of the furnace.

In order to obtain this equilibrium at about 700° C. the furnace was provided with a controller consisting of a thermocouple 24, an amplifier 25, a switch 26, and a couple of control-valves 27 and 28. Such a control device is generally known, and a similar device has been elaborately described in Bulletin 15–4R Copyright 1946 of the Brown Instrument Company, Philadelphia, Pa.

The temperature in the furnace space 29 was measured with the thermocouple 24, and as soon as this was 700° C. the amplifier disconnected the heating element 19 from the electric source with the aid of the switch 26.

The heat from the exhaust gases that flow through the pipes 30 and 31 was used to preheat the oxidising gas and the fuel gas with the aid of a heat exchanger as shown.

The valves 27 and 28 in the extra gas outlets 32 and 33, which are also controlled by the amplifier, were closed as long as the temperature in the furnace space was under 720° C.

However, if through the generation of heat in the cells, the temperature rose to a higher value, these valves 27 and 28 were opened by the amplifier, allowing a quantity of exhaust gas to escape into the air before it reached the heat exchanger. Therefore, this quantity of exhaust gas did not contribute to the preheating of the oxidising gas and the fuel gas. In this case the fuel gas and the oxidising gas acted as coolants for the furnace space 29 and the temperature in the furnace space dropped to the desired value.

By this arrangement a high degree of exhaustion of the fuel gas was obtained, the composition of this exhaust gas which escaped freely into the air amounting to 15 mol percent CO and 85 mol percent $CO_2$, whilst the exhaust air had a composition of 12 mol percent $O_2$ and 88 mol $N_2$ In this process a load was connected to the terminals 34 and 35.

The elements yielded a power output of 1.75 watts per square decimetre electrode surface at a current density of 2.5 a./dm.$^2$ at 0.7 v. on the average.

Figure 3:
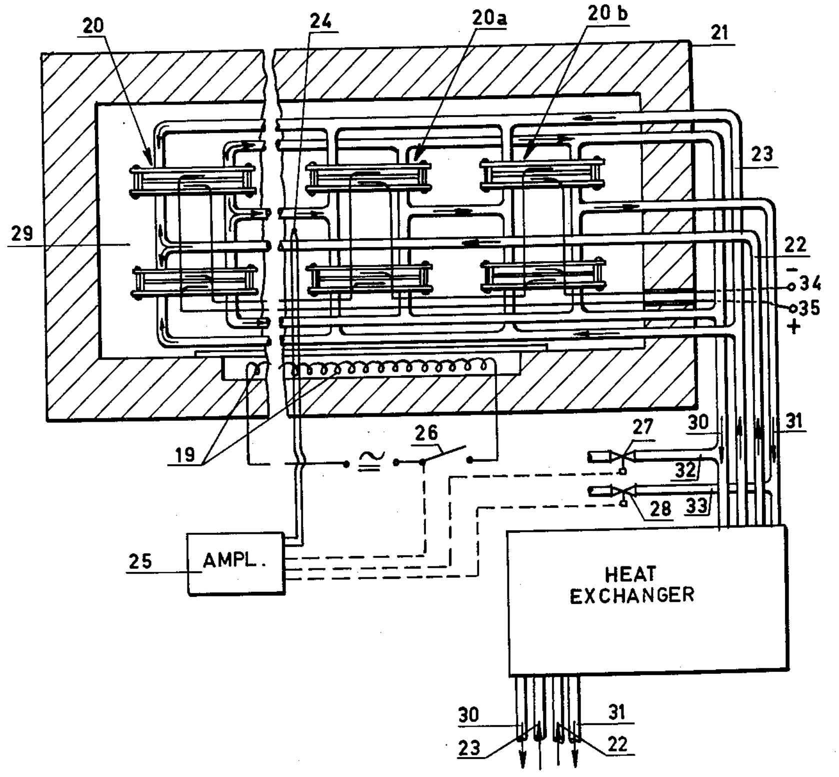
Fig. 3 is a diagram of a heat-insulated furnace, comprising a plurality of cells according to the invention, which cells are linked electrically, partly in series and partly in parallel to each other.

It is also possible to work a similar device with a hot fuel gas, the heat exchanger then being used for heating the oxidizing gas, whilst in this case a cooling element can be placed in the furnace, which cooling element can again be controlled by an amplifier as indicated in Figure 3.

As is shown in the table hereinbefore, the terminal voltage of these fuel cells depends on the current drawn from the cell. However, the voltage also depends on the composition of the fuel gas, and therefore it is necessary that for cells which are electrically parallel to each other, the fuel gas supplied to each cell has the same composition. On the other hand it is impossible or next to impossible to exhaust and convert the fuel gas substantially completely with only one passage through a cell. Therefore it is also necessary to have cells connected in series in respect to the fuel gas. In order to prevent, that this gas has a different composition in any of the cells, which are electrically parallel to each other, the plurality of cells which together form the device of Fig. 3, are divided into groups. In each group the cells are electrically parallel. Fuel gas is supplied to all the cells of the first group, the fuel gas which is discharged from the cells of this first group, and which is only partially converted, is assembled and mixed in a manifold, and from this manifold it is supplied to the second group of cells. The cells of this group are also electrically parallel, but the cells of the second group are electrically in series with the cells of the first group. The gas, discharged from the second group is again assembled in and mixed in a manifold from which it is supplied to the next group of cells etc.

I claim:

1. In a fuel cell a solid porous carrier of from about 1 mm. to about 10 mm. in thickness impregnated with a molten mixture of alkali metal carbonates as a semi-solid electrolyte having attached to each of its sides a layer of less than 1 mm. thick of separate pre-sintered grains of metal powder as electrodes of opposing polarity.

2. A high temperature fuel cell for the galvanic combustion of gaseous fuels at temperatures between about 450° C. and about 750° C. comprising a casing, a thin, rigid, solid porous carrier impregnated with a molten mixture of alkali metal carbonates as a semi-solid electrolyte, powder-form electrodes of opposing polarity in contact with and attached to said semi-solid electrolyte of thin layers of separate presintered metal powder grains, said power-form electrodes having a low flow resistance to the circulating gases and maintaining a low concentration polarization, metal gauzes in contact with both layers of powder-form electrodes, said metal gauzes being resistant to both the circulating gases and the powder-form electrodes, perforated rigid supports in contact with and pressing against said metal gauzes incorporating the rigid supports, the metal gauzes, the powder-form electrodes and the semi-solid electrolyte in a rigid relationship within said casing, means for supplying one of said powder-form electrodes with a fuel gas, means for supplying the other of said powder-form electrodes with an oxidizing gas, and means for withdrawing electrical energy from said powder-form electrodes of opposing polarity.

3. A fuel cell according to claim 2, wherein said perforated rigid supports are perforated metal plates resistant to the action of the gases.

4. A fuel cell according to claim 2, wherein said perforated rigid supports are metal networks resistant to the action of the gases.

5. A high temperature fuel cell for the galvanic combustion of gaseous fuels at temperatures between about 450° C. and about 750° C. comprising a casing, a sintered carrier of magnesium oxide of from about 1 mm. to about 10 mm. thick impregnated with a molten mixture of alkali metal carbonates as a semi-solid electrolyte, a powder-form electrode of presintered iron power in a layer of less than 1 mm. thick in contact with and attached to the anodic side of said semi-solid electrolyte, a powder-form electrode of silver powder in a layer of less than 0.5 mm. thick in contact with and attached to the cathodic side of said semisolid electrolyte, metal gauzes in contact with both powder-form electrodes, said metal gauzes being resistant to both the circulating gases and the powder-form electrodes, perforated rigid supports in contact with and pressing against said metal gauzes incorporating the rigid supports, the metal gauzes, the powder-form electrodes and the semi-solid electrolyte in a rigid relationship within said casing, means for supplying one of said powder-form electrodes with a fuel gas, means for supplying the other of said powder-form electrodes with an oxidizing gas, and means for withdrawing electrical energy from said cathodic and anodic powder-form electrodes.

6. A fuel cell for the galvanic combustion of gaseous fuels, comprising a casing, an alkalicarbonate electrolyte impregnated in a thin, rigid, porous solid inert carrier, as an anode, a layer of powdered metal, selected from the group consisting of iron, cobalt, nickel, rhodium, palladium, osmium, iridium, platinum, copper, silver, gold, chromium and manganese and mixtures thereof and alloys consisting of these metals only, in contact with and attached to the said electrolyte carrier, as a cathode, a layer of powdered metal, selected from the group consisting of rhodium, palladium, osmium, iridium, platinum, gold, silver and nickel and mixtures thereof and alloys consisting of these metals only, said anode and said cathode having a low flow resistance to the circulating gases and maintaining a low concentration polarization, a metal gauze in contact with each said layer of metal powder, said metal gauze being resistant to both the circulating gases and the metal powders, and rigid supports with openings for the passage of the gases, said rigid supports pressing against said metal gauzes, means for incorporating the rigid supports, the metal gauzes, the powdered metal anode, the powdered metal cathode and the electrolyte carrier in a rigid relationship within said casing, means for supplying said powdered metal anode with a fuel gas, means for supplying said powdered metal cathode with an oxidizing gas and means for withdrawing electrical energy from said powdered metal cathode and anode.

7. A process for the production of a fuel cell in which electrodes in metal-powder form are present, comprising the steps of presintering metal-powder grains of a preselected size by reducing an oxide of a suitable metal powder with gaseous reduction means at a temperature which is equal to or a little higher than the operating temperature of the cell, applying these powder grains in a thin layer to a thin, rigid, solid, porous carrier impregnated with a molten mixture of alkali metal carbonates as a semisolid electrolyte in the cell, said electrodes having a low flow resistance to the circulating gases and maintaining a low concentration polarization, placing a metal gauze on said grains, said metal gauzes being resistant to both the circulating gases and the powder-form electrodes, and supporting and pressing said gauzes into place by solid perforated plates.

8. A process for the production of a fuel cell in which electrodes in metal-powder form are present comprising the steps of presintering iron-powder grains of a preselected size by reducing iron-oxide powder with hydrogen at a temperature equal to or a little higher than the operating temperature of the cell, applying these powder grains in a thin layer to the anodic side of a thin, rigid, solid, porous carrier impregnated with a molten mixture of alkali metal carbonates as a semi-solid electrolyte, said electrodes having a low flow resistance to the circulating gases and maintaining a low concentration polarization, applying silver-powder grains to the cathodic side of said porous electrolyte carrier, placing a metal gauze on said electrodes, said metal gauzes being resistant to both the circulating gases and the powder-form electrodes, and supporting and pressing said gauzes into place by solid perforated metal plates.

9. A process for the production of a fuel cell in which electrodes in metal-powder form are present, comprising the steps of presintering metal-powder grains of a preselected size by converting a metal compound into a metal by heating at a temperature which is equal to or a little higher than the operating temperature of the cell, applying these powder grains in a thin layer to a thin, rigid, solid porous carrier impregnated with a molten mixture of alkali metal carbonates as a semi-solid electrolyte, said electrodes having a low flow resistance to the circulating gases and maintaining a low concentration polarization, placing a metal gauze on said grains, said metal gauzes being resistant to both the circulating gases and the powder-form electrodes, and supporting and pressing said gauzes into place by solid perforated plates.

References Cited in the file of this patent

UNITED STATES PATENTS

| | | |
|---|---|---|
| 2,384,463 | Gunn et al. | Sept. 11, 1945 |
| 2,830,109 | Justi et al. | Apr. 8, 1958 |
| 2,914,596 | Gorin et al. | Nov. 24, 1959 |

FOREIGN PATENTS

| | | |
|---|---|---|
| 913,911 | Germany | June 21, 1954 |
| 521,773 | Great Britain | May 30, 1940 |